(12) United States Patent
Dieberger et al.

(10) Patent No.: US 7,925,660 B2
(45) Date of Patent: Apr. 12, 2011

(54) METHOD FOR VISUAL STRUCTURING OF MULTIVARIABLE DATA

(75) Inventors: Andreas Dieberger, Los Gatos, CA (US); Rene A. Pawlitzek, Kilchberg (CH); Markus G. Stolze, Mount Kisco, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/389,872

(22) Filed: Feb. 20, 2009

(65) Prior Publication Data

US 2009/0249184 A1  Oct. 1, 2009

Related U.S. Application Data

(63) Continuation of application No. 10/970,913, filed on Oct. 22, 2004, now Pat. No. 7,516,114.

(51) Int. Cl.
*G06F 7/00* (2006.01)
*G06F 17/30* (2006.01)

(52) U.S. Cl. ............. 707/757; 715/212; 726/22; 726/23
(58) Field of Classification Search .................. None
See application file for complete search history.

(56) References Cited

U.S. PATENT DOCUMENTS

| 5,561,793 A | * | 10/1996 | Bennett et al. | ............... 707/201 |
| 6,613,099 B2 | * | 9/2003 | Crim | ............................. 715/210 |
| 2003/0004689 A1 | * | 1/2003 | Gupta et al. | ................. 702/188 |

* cited by examiner

*Primary Examiner* — Khanh B Pham
*Assistant Examiner* — Azam Cheema
(74) *Attorney, Agent, or Firm* — Michael J. Buchenhorner; Vazken Alexanian

(57) ABSTRACT

A system for visual structuring of multivariable data sets includes a plurality of sensors for monitoring data and generating events depending on the monitoring; an intrusion detection system for receiving the events generated by the sensors; a plurality of agents for performing pattern recognition on the events, wherein the agents determine whether there are events showing patterns relevant for security purposes; and a display device operatively coupled with the intrusion detection system for displaying in tabular form the events with relevant patterns.

19 Claims, 4 Drawing Sheets

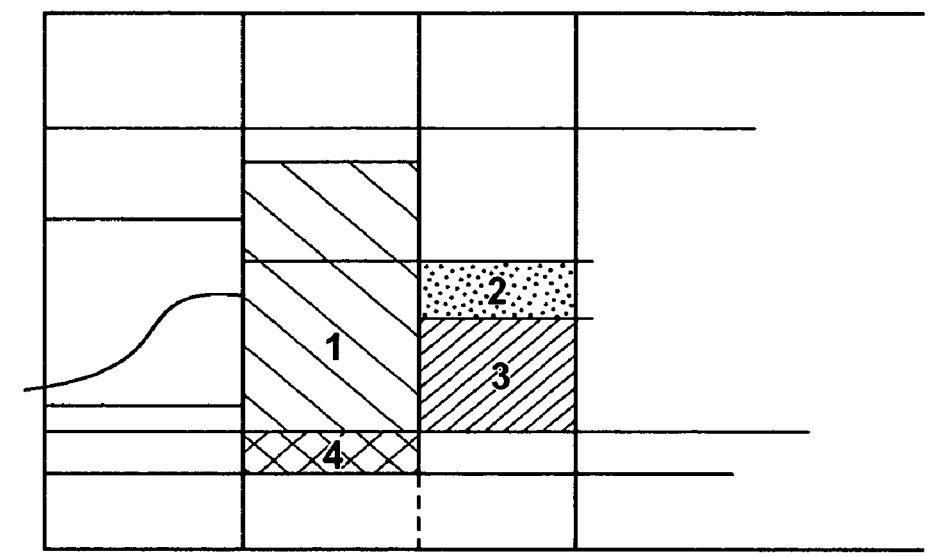
Fig. 3
Fig. 4   A   B   C   D   E   F
Fig. 5
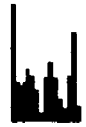
Fig. 6

METHOD FOR VISUAL STRUCTURING OF MULTIVARIABLE DATA

CROSS-REFERENCE TO RELATED APPLICATIONS

This application is a continuation of, and claims priority from, commonly-owned, U.S. application Ser. No. 10/970,913, filed on Oct. 22, 2004, which application is incorporated by reference herein.

BACKGROUND OF THE INVENTION

The amount of data to be processed increases very rapidly. This increasing amount of data could be found in almost every business field, especially in the area of computer network security. However other business fields use data bases managing a large amount of data also.

Most often tabular displays of records are used for analyzing multivariable data sets. Each row in the table represents a record and a column of the table displays field values of the records. For larger numbers of records such tabular display will only contain a few records fitting on the screen, other records being reachable through interactive scrolling, by which the window of visible records is moved. One frequently needed analysis in such contexts is to identify groups of similar records having identical or close to identical values in at least one of their fields. Once such a group or block of similar records is identified, the second question is then how homogeneous the group is, that is, how well the records in the group match in their most important field values to be treated as closely related, or whether a more homogenous sub-group can be identified.

A usual method for identifying groups of records that have a particular field value in common is to sort the records in the table according to the given field value. Such sorting places all records with the same field value next to each other. Users can then inspect the list of records and their field values more closely and find out how many groups with different field values are present in the list and how homogeneous the identified groups are.

However, the difficulty with this approach is that it can be difficult to recognize the groups and assess their homogeneity if field values are visually similar. For example, if only a few digits in a long number are different, it can be difficult to spot these differences by glancing over the list of records. Therefore, to be really sure, users spend considerable time for detailed inspection of field values if they want to be sure that they have correctly assessed the equality or inequality of field values. Depending on the importance of the decision and the number of fields that can contain visually similar field values the effort needed for this group identification task can be a burden to users and slow them down considerably in their overall task.

With the expansion of the internet, electronic commerce and distributed computing, the amount of information transmitted via computer networks is continuously increasing. Such possibilities have opened many new business horizons. However, they have also resulted in a considerable increase of illegal computer intrusions. That is why intrusion detection has become a rapidly developing domain. An intrusion detection system is composed of hardware components and software components. The hardware components are used for receiving, processing and displaying the so-called events. An event is a multivariable data record having multiple data properties or fields. The events are monitored for determining if an attack or if a potential intrusion has occurred. Given the current state of network intrusion detection systems and event correlation technology the monitoring of events by human specialists is used for considerably reducing the number of false alarms that network-based intrusion detection system typically report.

SUMMARY OF THE INVENTION

A system for visual structuring of multivariable data sets includes a plurality of sensors for monitoring data and generating events depending on the monitoring; an intrusion detection system for receiving the events generated by the sensors; a plurality of agents for performing pattern recognition on the events, wherein the agents determine whether there are events showing patterns relevant for security purposes; and a display device operatively coupled with the intrusion detection system for displaying in tabular form the events with relevant patterns.

DESCRIPTION OF THE DRAWINGS

Preferred embodiments of the invention are described in detail below, by way of example only, with reference to the following schematic drawings.

FIG. 3 shows an arrangement of blocks for navigating in between;

FIG. 4 shows a plurality of summarized information items used for the detail view;

FIG. 5 shows a distribution of values of a certain field;

FIG. 6 shows an alternative representation of the distribution shown in FIG. 5;

Figure 1:
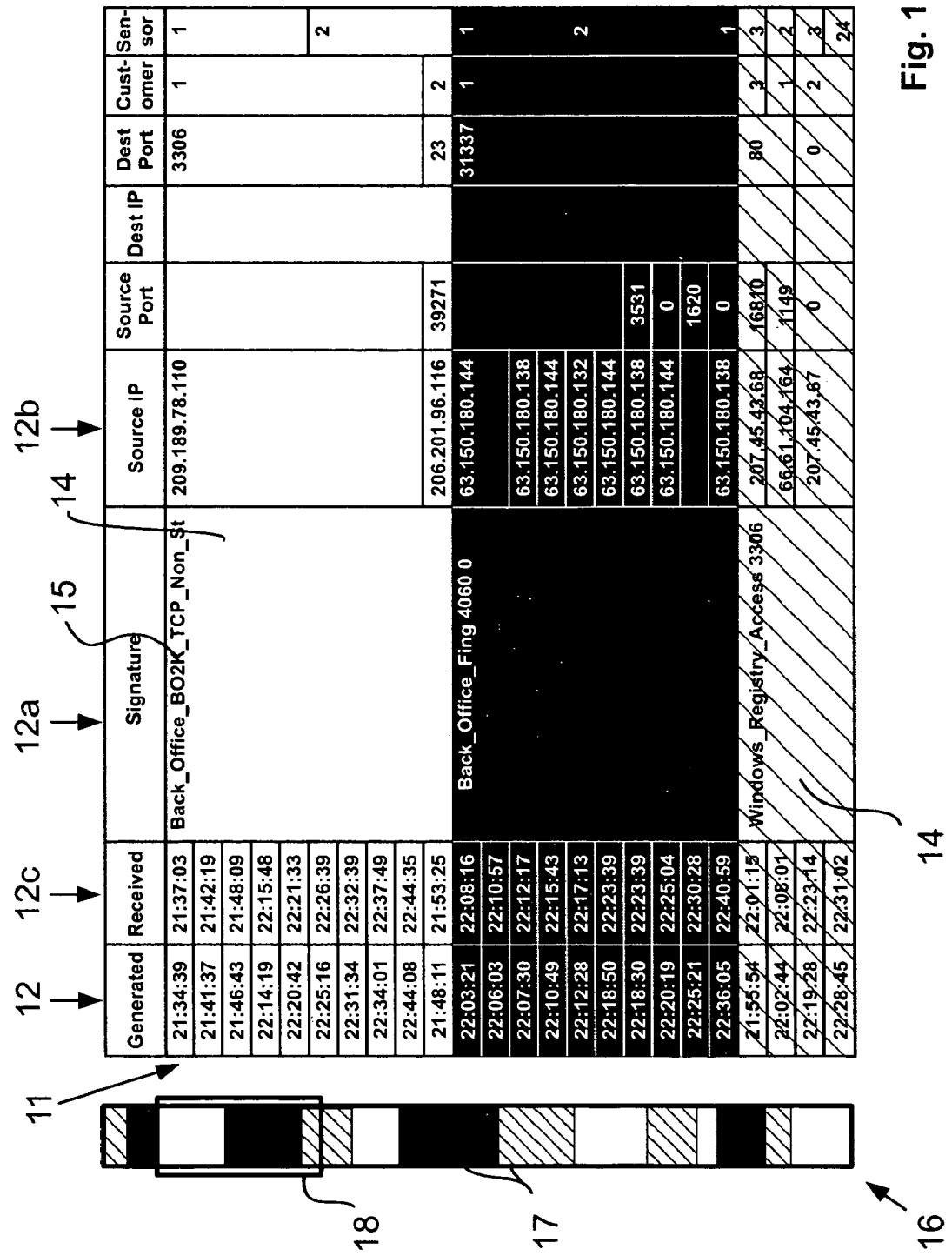
FIG. 1 represents a tabular representation of records according to the present invention.

The drawings are provided for illustrative purpose only and do not necessarily represent practical examples of the present invention to scale. In the following the various exemplary embodiments of the invention are described. Although the present invention is applicable in a broad variety of applications it will be described with the focus put on intrusion detection applications or security event monitoring applications. Another field for applying the invention might be an online analysis function for large amount of data.

DETAILED DESCRIPTION OF PREFERRED EMBODIMENTS

The invention deals with an approach for visual structuring events triggered by one or more intrusion detection systems in a computer network. However, the inventive technique may also be useful for displaying other types of events, not just intrusion events.

The monitoring of events, in particular intrusion events, represents a task that requires high skill and attention from the monitoring staff. The reason for this is that in many applications a large fraction of the reported events are simply so-called 'false' positive alarms. The challenge for the operator is therefore to spot those events that are associated with a real security problem. In order to identify such security events, the operator of the intrusion detection system on the one hand is interested in continuously watching a main characteristic of the incoming events and on the other hand to uncover interesting event patterns.

The invention could be applied in the field of interactive support systems for security event monitoring and in particular systems supporting centralized monitoring of security events and alarms generated by a multiplicity of sensors such as intrusion detection systems.

To perform this task more efficient and effective, human operators are supported in their task. However before an event is visualized it is processed by means of a pattern detection algorithm. This pattern detection algorithm enables to detect whether an arrived event is part of a given pattern on the basis of a comparison of the fields allocated to this given pattern and the fields associated to the arrived event. After using that kind of pattern recognition for filtering the arriving events, the detected events or alarms are visualized or displayed.

The alarms are generated by a multiplicity of sensors, wherein these sensors generate a large number of 'false positive' events, that are events that are not actual indications of a threat to a network. To determine whether an event or set of events can be classified as 'false positive' operators inspect one or more of the different properties of the events under investigation. Examples of intrusion event properties include source-IP, destination-IP and alarm type, and others.

Typically operators in such centralized security operation centre monitor a number of sensors in parallel. This number of sensors generates a number of security events which are studied to determine whether they imply a potential threat. Frequently operators will try to assess events at a level of groups or blocks of events which have at least one property in common. For this, operators sort the events in the table according to one of the event properties so that events with the same field value are moved next to each other. They can then investigate the resulting blocks of similar events and in many cases deal with them at the level of event-groups, which is faster than at the level of individual events. Often there will be more events to process than can be displayed on a single screen, and even a single block of events with the same field value might spawn more than a screen. In some situations it is important to operators to know the relative size of the currently viewed block of events compared to other blocks, to know how many different field values (and therefore blocks of events) are represented in the current list of events, and to find the largest block of events.

With state of the art tools for security event monitoring operators scroll through the whole list of events to gain the needed overview to be able to answer these questions.

Referring now to FIG. 1, in the inventive method the multivariable data sets are provided in records 11. Each event is illustrated as a record 11. The record 11 is represented in tabular form on a display device. Each record 11 forms a row in the tabular view. A record 11 includes several fields 12, 12a, 12b, 12c characterizing different attributes or properties of the event. Field values of the same field in the records 11 are arranged in columns. To find patterns or regularities the set of records 11 is sorted. Therefore a key field 12a is defined to be used for sorting the records 11.

In FIG. 1 the "Signature" field 12a is exemplarily defined as the key field. That means the records 11 will be sorted based on the "Signature" field 12a. After having sorted the records 11, equivalent field values of the key field 12a are grouped so as to form a block 14. There are different field values in the key field 12a, so several blocks 14 are defined having here different sizes. As can be recognized in the column of the Source IP field 12b there are also blocks having equivalent field values in this column. It can be useful to define a second key field for sorting the records. In the present case the second key field is the "time of receiving" field 12c. According to the invention only one field value 15 in a block 14 is displayed. All other field values of that block 14 are hidden or masked. So the operator will easily see the respective one field value 15 of the field 12a in the block 14. This will drastically facilitate the monitoring of records.

To further support the visibility, colors or hatchings are used for the number of records 11 having equivalent field values in the defined key field 12a. FIG. 1 uses different hatchings, wherein by using different colors the blocks 14 could also be differentiated very easily. Also the removing of border lines of cells within a block 14 supports the visibility.

FIG. 1 illustrates a panorama bar 16. The panorama bar 16 is arranged nearby the tabular form. It is composed of block elements 17. Each block element 17 represents a block 14 in the tabular view, wherein the size of the block elements 17 is set in relation to the size of the blocks 14. The panorama bar 16 fits on the display. Therefore it is possible to see the big picture of blocks 14 without scrolling through the whole set of records 11. The block elements 17 are colored or hatched in the same style as the related blocks 14.

Figure 2:
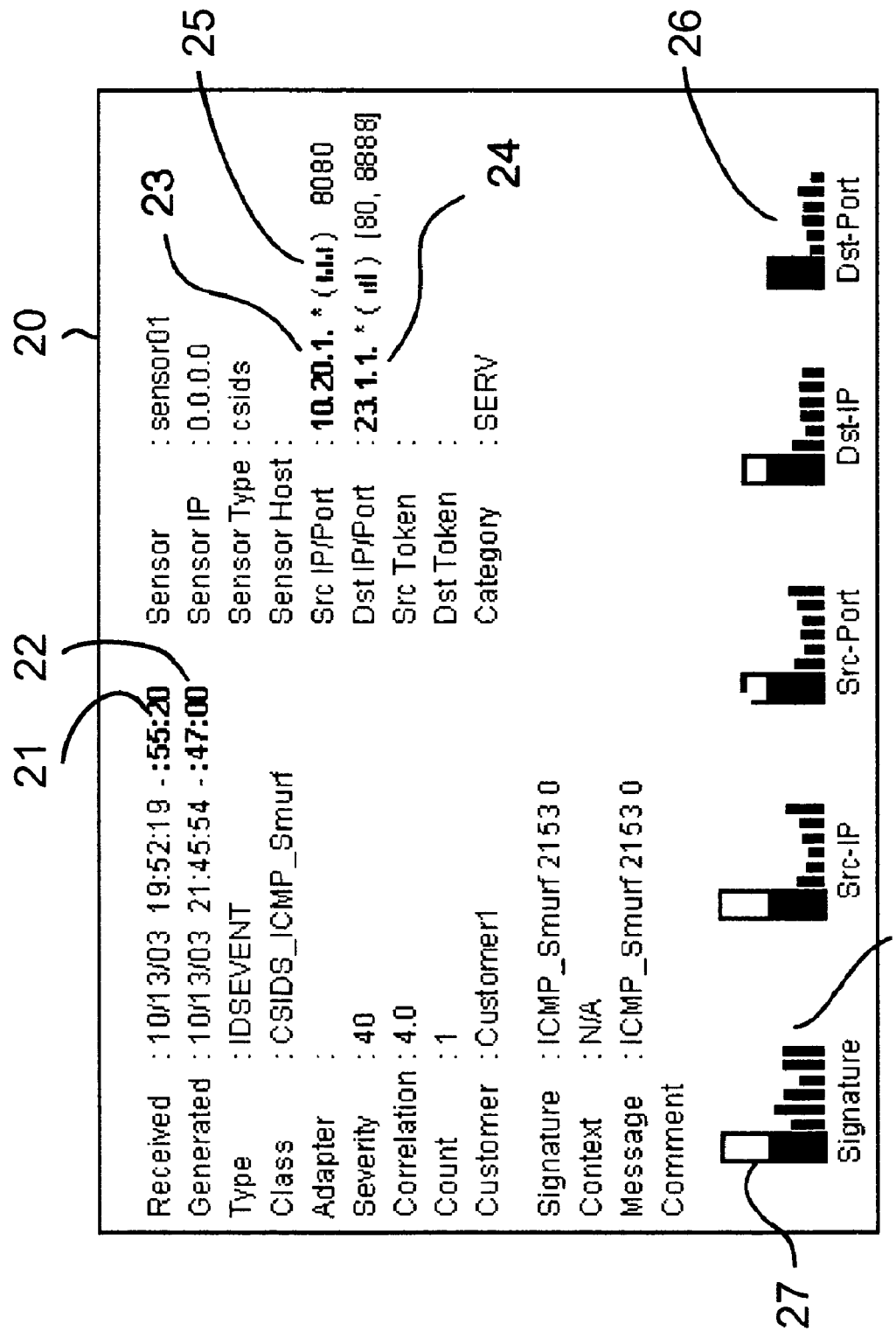
FIG. 2 shows a detail view according to the present invention.

FIG. 2 represents a detail view 20. The detail view 20 will be shown in a separate window. To show the detail view 20, the operator selects a block 14 or a group of events. The detail view 20 shows the field values in the field 12 of the records related to the selected block 14 or group. In this example, the most field values of the field 12 are unique. However the fields "receiving time" 12a, 21, the "generation time" 12, 22, the "source IP address" 12b, 23 and the "destination IP address" 24 have field values within a certain range. The detail view 20 summarizes the range of field values in a summarized information item 25. By using the summarized information item 25 the operator can quickly assess if there is a certain trend or distribution of field values representing an intrusion.

In the following the detail view 20 is explained in more detail. In some application domains, for example in event monitoring, group detail views are called up when the user expects to find some regularity within the data of the collection. Therefore, the user is less interested in seeing every single field value, but they are interested in potential patterns within field values and how these patterns differ over several fields. For example, if the user selects a group of entries or records 11 that all have the same field value in field 12a it is interesting to see whether field 12b also contains only a single value, or randomly distributed unique field values, or a sequence of ascending field values without duplications and so forth.

Depending on the application domain there are regularities which are of particular interest to the user. The goal of the group detail view 20 is to analyze the collection of field values, detect these special cases and to highlight them in the detail view 20. Examples for such regularities are all records 11 show the same field value in a certain field there is a relatively small number of different field values, e.g. 2 or 3 values all records 11 are unique the records 11 completely cover a specified range of field values the records 11 show a pattern within a range (such as: every second value or only even numbers occur)

the field values show an unusual distribution. For example almost all records 11 are in a relatively small range, but one field value is different.

In large amounts of records 11 it is very difficult to find such cases using a tabular representation. On the other hand, a detail view 20 which highlights these special cases makes finding such regularities easier. The specific method to detect such a pattern can be selected from methods known in the art.

Algorithms can be used which are applied on the range of field values to generate the summarized information items 25.

The detail view 20 can also provide an indication about the temporal distribution of field values. This assumes that each entry is associated with a time stamp which is the typical case in domains such as event monitoring. In these domains it is not only of interest how the field values are distributed within a group of events, but also how a certain field value is distributed over time within the entire set of records 11. Such temporal information typically is shown only for a certain field, such as the key field 12*a* in the data. For example, a bar chart 26 can indicate the relative frequency of a certain field value within specified time ranges. Another indicator 27 would show the relative frequency of a certain field value within the list of reviewed and unreviewed events.

For example, in an event monitoring application, the event signature (field 12*a*) tells the user about the kind of event. It is useful to know if a certain type of event occurs unusually often. The bar chart 26 is an embodiment of a temporal distribution indicator. The indicator bar 27 to the left shows the proportion of reviewed and unreviewed occurrences of the signature field 12*a* within a predetermined time, e.g. the last hour. The bar chart 28 to the right indicates the occurrence frequency of that signature within 6 time slices, e.g. 10 minute duration, with the leftmost bar representing the most recent one. In this depicted example, the signature value under consideration does not show a special trend over the last hour.

When generating the detail view 20, the group of events to be shown might contain more than one field value in the signature field 12*a*. In such a case the same principle is used to generate the chart showing temporal distribution. The only difference is that the bars now do not show the frequency of a single field value (signature) but of several signatures. Should one field contain only one unique field value, the preferred embodiment would indicate this special case, for example by changing the color of the field representation.

As mentioned above, the detail view 20 does not try to show every field value within a group. Sometimes, though, users may need to study individual field values. It is possible to select a number of field values within the detail view 20 and call up an additional view showing only these field values. This third view shows fewer entries (only the group of entries originally selected) and fewer fields. Thus, it should be sufficient to handle these field values in a conventional table view. In order to display detail field values for individual fields a simple scrollable list should be sufficient.

FIG. 3 shows an exemplary arrangement of blocks 14 having equivalent field values. In tabular data it is often necessary to select groups of entries that exhibit similarity in one of the table columns. For example, after sorting a table by column A a user might want to perform an operation on all entries or records 11 with a specific field value in that column A. In table-based representations such as spread sheets, but also in event viewers, users would drag over the whole range of rows with the mouse or click on the first row of that range, then scroll to the last row and Shift-click that last row.

As described above, a part of a table column with identical field values is denoted as block 14. To easily navigate between the blocks 14, a selection method is proposed for a contiguous range of rows by double clicking into any cell within a block. That activity selects the entire block 14, including those rows which might be off screen. Essentially, the action first selects one cell and then extends the selection upward and downward as long as it finds identical field values within the column that was clicked. The block 14 selected in that way becomes the current block.

| 515 | MINOR | 199.173.225.5 | 206.160.217.226 |
| 516 | MINOR | 208.30.146.37 | 151.36.194.150 |
| 517 | CRITICAL | 129.33.64.116 | 204.116.44.2 |
| 518 | MINOR | 129.33.65.36 | 24.26.139.180 |
| 519 | MINOR | 57.8.195.50 | 192.168.196.2 |
| 520 | MINOR | 153.2.242.83 | 67.97.251.18 |
| 521 | CRITICAL | 129.33.64.111 | 204.116.44.2 |

In the table shown double-clicking on the word "MINOR" in row 519 selects the three rows 518 till 520 because the first column contains the identical field value in all three rows. The current block becomes the three cells containing the field value "MINOR" in rows 518-520. This kind of use for block selection is convenient for spread-sheet applications where the user wants to perform some action on a block of identical field values.

In applications like event monitoring, a user does not select individual cells, but is interested in complete rows. Therefore, when the user performs a block select as described, the block 14 with the value "MINOR" becomes the "current block" but the selection is the complete three rows 518-520. This activity also calls up a detail view 20 for the three events represented in these rows.

In a state-of-the-art event monitoring application users select a row in the event table, call up a detail view 20 and then use the cursor keys to move to the next rows, updating the detail view 20. Using the block selection technique described in combination with the detail view 20 described above allows users to quickly and easily select related groups of events for further study. It is useful to allow users to provide key-stroke navigation not just for row-by-row navigation, but also for moving around the event table based on groups of related blocks 14.

The FIG. 3 shows a sketch of an event table sorted by two columns. Double-clicking the block labeled 1 makes block 1 to the current block and selects all the rows containing cells within that block. Using a key combination and cursor right the current block becomes the first block to the right 2 and the row selection and the detail view 20 updates accordingly. Moving the cursor down, the current block becomes block 3 and the selection and detail view 20 updates again. Moving the cursor left would then select again block 1 as current block. For this interaction technique to be intuitive, the system provides two selection highlights. One of them indicates the range of rows that are selected, the "selection" in the traditional sense. The other highlight shows the current block.

The combination of block selection, block keyboard navigation and detail view 20 is an extremely powerful tool for exploring event data.

In the following some examples are given for representing patterns within field values.

As described, the detail view 20 is based on the idea to illustrate patterns within field values, as users are less interested in individual field values than in the distribution of field values within a group of selected entries or records 11. A number of example representations will be described.

Depending on the application domain an embodiment will highlight some of these cases as special but not others. For example, case a) (unique field value) could be highlighted as special in some applications, but considered less interesting in others.

If all field values within a group are identical, the unique field value is displayed.

If the field contains only a relatively small number of different field values, a list of the different field values will be displayed. A preferred embodiment also indicates the number of occurrences of each field value. For example, if a field contains only the numbers 1 and 2, this could be shown as fieldname: 1, 2 or fieldname: 1 (32), 2 (11), wherein the number in brackets gives the number of occurrences of the certain field value.

The amount of space within the detail view 20 needed to display each field value determines the appropriate maximum number of field values to show. Typically, the number of field values to show will be in the range of 2 to 5.

In another example the field values do not exhibit any particular pattern. In this case a wildcard character is used, such as "*" or fieldname: * (50). The number in brackets should show the number of field values in the field. A preferred embodiment provides a facility to call up the individual field values of that field as a scrollable list. The user can call up the list if they are interested in.

In another example a pattern is detected within the field values. In this case a wildcard character or a range description and an icon describing the pattern found are displayed. As described the types of interesting patterns are dependent on the application domain. Typically there should be summarized information icons as shown in FIG. 4 A-E:

For ascending values a possible icon is shown in FIG. 4A.
For descending values a possible icon is shown in FIG. 4B.
For alternating values a possible icon is shown in FIG. 4C.
For values covering a range of field values, the lowest and highest field values in that range are indicated. A typical indicator is [a . . . b]
For field values covering 2 or 3 ranges of values with distinct gaps in between a typical indicator is [a . . . b] [c . . . d]. A possible icon is shown in FIG. 4D.
For field values mostly covering a range of values [a . . . b] with very few outliers c, d a typical indicator might be [a . . . b], c, d. A possible icon is shown in FIG. 4E.

Further icons could be used depending on the quality of display. To increase the amount of information or the advertency of the user the icons could be colored.

Many such patterns can be described using regular expressions, which is well known. However the goal of the detail view 20 is not to describe every possible pattern, but to highlight a relatively small number of interesting patterns. Therefore a preferred embodiment will keep the number of patterns, icons and representations relatively small and relatively simple. In another case the field values show a mathematically describable distribution, for example a normal distribution. This case should be shown using a wildcard and either an icon to indicate the distribution, or a textual description. A potential icon for a normal distribution is shown in FIG. 4F. The icons given in FIG. 4A-F could be supported by the possibility to call up a list of the field values.

In some cases, it might be appropriate to visualize the distribution of field values in a field. This kind of visualization differs from a visualization of temporal occurrence as shown in FIG. 2, which shows the distribution of time stamps for a specific value. For instance, for a field that can take field values in the range [0 . . . 99] only it is easily possible to visualize occurrence of field values in that range. This way both the distribution as well as the relative frequency of field values is visible. An example for such visualization is shown in FIG. 5. Each field value in the range [0 . . . 99] is shown as a vertical bar, the length of which indicates the relative frequency of a field value in the data set. If the system cannot detect unusual patterns, such visualization can give the user some idea of the distribution of the field values.

If the range of field values exceeds the available space it is possible to group subranges into summary bars. For instance, the range [0 . . . 255] can be represented as 16 groups with a range of 16 field values each, as illustrated in FIG. 6. That way, that range can be shown as a chart with only 16 bars. This chart shows less information, but for some applications, it is sufficient to indicate all field values grouped in a relatively small value range with relatively few outliers. The FIG. 6 shows field values in a range of [0 . . . 255] exhibiting a similar pattern as the values in FIG. 5.

It is also possible to create an abstract visualization which yields an icon-like representation of the characteristic distribution as follows: The frequency of each value in the range is classified into a number, here a small number of 3, of value ranges (low, middle, high). For instance, if the least frequent value occurs once and the most frequent one occurs 10 times, these ranges could be [1 . . . 3] [4 . . . 7] [8 . . . 10]. Then the visualization of frequency is generated from the lowest to the highest value. The frequency of the first value (n) is drawn as a bar indicating the frequency as low, middle or high. If the next value (n+1) is in the same frequency range, it is not drawn. However, if it is in a different range, it is shown. This procedure is repeated through the whole range of values. Thus consecutive identical bars that indicate the same frequency range are eliminated and the visualization is shortened. In the worst case this representation can be as long as the representation in FIG. 5, but in the optimal case it is much shorter. Furthermore, as this representation reduces the distribution data into 3 value ranges, the representation is limited in height which makes it especially appropriate to be used inline within text. The kind of displaying the summarized information icon for a certain field depends on the application domain.

If there are fields containing textual data a pattern matcher might find more complex patterns within the field data, such as reoccurring substrings, password data, or parts of command strings. Highlighting such cases is especially useful in longer textual fields which potentially cannot be shown in their entirety.

A typical case in the event monitoring domain is that event data contains a comment field which is seldom shown. The comment field frequently is empty, but it can also contain a large amount of text. It is difficult to provide adequate space for long text in a detail view 20 if it is used only sparingly. Thus, these fields are often not checked. It can be very relevant, though, to know when such a comment field contains URL information, passwords or other potentially sensitive information. A pattern matcher can be used to check for these occurrences and indicate them. Again depending on the application domain a relatively small number of icons can describe whether such special cases were found in a textual field. An example for such a representation might be: "http://*" (3), x@y.z (5) this could indicate that 3 "strings look like URLs" and 5 "strings look like email addresses" were found.

Another special case is the representation of groups of IP numbers. This case is especially relevant in the event monitoring domain. IP numbers consist of several numerical fields, separated by dots. An example is the IP number 127.2.1.47. A typical example for an interesting pattern in event data occurs when an intruder sequentially scans through a range of IP numbers. This would generate a group of events where this IP number field shows a distinct pattern. Displaying such a pattern for IP numbers is actually a special case of a representation for a single field because 4 numerical fields which can contain the values [0 . . . 255] are grouped together. Typically interesting patterns in IP numbers occur through variation within one field.

For example, a "port scan" could generate events that show the following IP numbers: 127.1.2.1:0, 127.1.2.1:1, 127.1.2.1:2, 127.1.2.1:3, etc. Intruders try to distribute their actions over time so that events with these IP numbers do not occur one right after the other. However, when sorting event data by signature field and receiving or generation time, these events get grouped together and become easier to find. Selecting such a group and calling up a group detail view 20 then highlights the IP number sequence, shown above. Instead of a user having to detect the pattern visually in the event table, the detail view 20 points out a potentially interesting pattern to the user who can focus on assessing the threat.

The representation of IP numbers uses the same principles as for single field values. Thus, this example can be represented as a combination of the representations described above. The first example shows a purely textual information icon. The second example shows a combination of a textual information icon with an iconic representation of a pattern in the group of field values.

textual representation: 127.1.2.[1 . . . 63]
iconic representation: 127.1.2.[1 . . . 63] (🔊)

The inventive characteristic of the detail view 20 is the analyzing collections of data and finding an appropriate formal description of the patterns encountered in field values. Patterns in the data which are considered relevant for the application domain are then highlighted either using a formal or an iconic representation.

To find patterns it is not necessary to look for identical field values only. For certain application domains it can be useful to consider a similarity among field values. For example, a field called signature (describing a class of events) might contain signatures that are only small variations within an event class, such as "someevent-1234" and "someevent-1235". Depending on the application domain it can be appropriate to consider these two signatures as "similar" and to treat them as one field value within the group detail view 20. This case does not change the embodiments described in this document. A preferred embodiment would simply consider such similar field values as identical when detecting patterns and generating temporal distribution charts for the group detail view 20.

Figure 7:
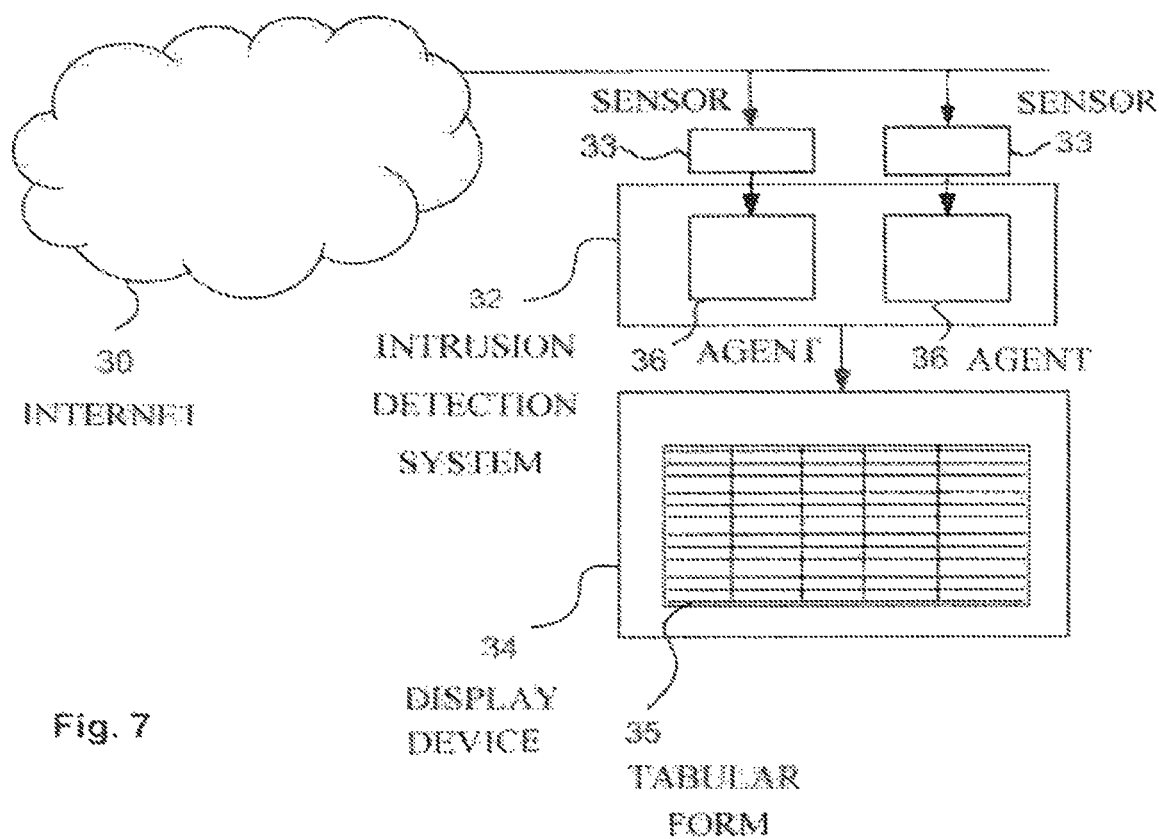
FIG. 7 shows a system for displaying events according to the invention.

FIG. 7 illustrates a system environment for performing the inventive method. The data are generated somewhere in the internet 30. A plurality of sensors 33 is monitoring the data and generating events depending on the monitoring task. An intrusion detection system 32 receives the events from the sensors 33. The intrusion detection system 32 includes agents 36 or adapters for performing a pattern recognition or pattern correlation on the incoming events. The agents 36 check whether among the received events there are events showing patterns, which are relevant for the security. Such detected events are displayed on a security console or display device 34 in tabular form 35 as described above.

The inventive method provides a possibility to facilitate the monitoring of records 11 in tabular form. Especially in the field of intrusion detection systems the displaying of only one field value for blocks of fields having equivalent values improves the monitoring or analyzing of multivariable data sets. The combination with a detail view 20 showing details of field values of a selected block in summarized information items provides an advantageous function that reduces the amount of elaborate sorting work. Thus an operator of a security console can concentrate on finding threats.

The method can be used by a service provider to offer a service to a customer. The customer can send its records to the service provider who performs the described method to obtain as output the records in the visually structured form. The output can be delivered to the customer. Also, the output can further be used by the service provider to perform a record analysis based on the visually structured form. The record analysis is used to identify patterns within the record fields that are indicative of an undesired situation, such as an attack by a third party. The identified attack can be notified to the customer. Also, upon identification of an attack, the service provider can provide the service of performing a protective attack countermeasure for the customer, such as blocking the attack, quarantining the customer system, deleting the attacking code or the like.

The invention claimed is:

1. A system for visual structuring of multivariable data sets, the system comprising:
   a processor and memory;
   a plurality of sensors for monitoring data and generating events depending on the monitoring task, wherein the sensors are configured to receive the data from a network, wherein an event comprises a multivariable data record having multiple data properties;
   an intrusion detection system for receiving the events generated by the sensors; a plurality of agents for performing pattern recognition on the events, said plurality of agents operatively coupled with the intrusion detection system; wherein the agents are operable for determining whether among the events there are events showing patterns relevant for security purposes; and
   a display device operatively coupled with the intrusion detection system, the display device for displaying the events comprising relevant patterns in tabular form, wherein each event of the events being displayed is presented as a record;
   wherein the tabular form comprises a plurality of rows and columns for representing the record on the display device, each record comprising a plurality of fields characterizing different attributes of its corresponding event;
   wherein field values of a same field in the records are arranged in columns; and a computer readable storage medium including an executable program for visual structuring of multivariable data sets being provided in records, the records including a plurality of fields and being displayed in tabular form on the display device, wherein the program performs the steps of:
   defining one of the fields as a key field;
      sorting the records by the key field; finding equivalent field values in the fields in the records arranged adjacent to each other;
   defining a block for those equivalent field values; displaying one field value of the block; and
   masking all other field values within the block.

2. The system of claim 1 wherein the network is the Internet.

3. The system of claim 1 wherein the plurality of the agents are contained within the intrusion detection system.

4. The system of claim 1 wherein the display device is further operable for presenting a detail view of the records in a separate window.

5. The system of claim 4 wherein the display device is further operable for presenting the detail view by selecting a specific block, said detail view showing field values in a field of the records related to the specific block.

6. The system of claim 5 wherein the at least one field is the key field.

7. The system of claim 4 wherein the display device is further operable for presenting the detail view providing an indication about a temporal distribution of field values, wherein each entry is associated with a time stamp of at least one field.

8. The system of claim 1 wherein the tabular form comprises visibility enhancement selected from a group of enhancements consisting of: colors, hatching, border lines around cells, and any combination thereof.

9. The system of claim 1 wherein the records whose display fields have equivalent field values are arranged adjacent to each other.

10. The system of claim 9 wherein the records arranged adjacent to each other employ visibility enhancement for facilitating monitoring of the multivariable data set.

11. The system of claim 1 wherein the display fields comprise a source IP address, signature, and time of arrival.

12. The system of claim 1 wherein the display device is further operable for presenting a panorama bar comprising block elements whose size is set in relation to a size of each of the blocks for a predetermined field for all records.

13. The system of claim 12 wherein the panorama bar comprises a scaled size fitting on the display device for providing an overview for a distribution of the blocks within the records.

14. The system of claim 13 wherein the block elements of the panorama bar comprise the visual enhancements used for the blocks of the predetermined display fields.

15. The system of claim 12 wherein the panorama bar further comprises an indicator frame indicating a currently displayed position within the records.

16. The system of claim 1 wherein the display device is further operable for providing a detail view for a selectable number of records, wherein field values of all display fields of the selected records are displayed, and wherein those fields values that exhibit a range of values within the selected block are provided with a summarized information item.

17. The system of claim 16 wherein the summarized information item is one of a graphical distribution of field values, a number of different field values for the field in the selected records and a trend of field values for a predetermined time.

18. The system of claim 1 further comprising an input device for selecting a current block and displaying the detail view of the current block.

19. The system of claim 1 wherein the key field is defined by finding equivalent field values in all display fields.

* * * * *